US006804657B1

(12) United States Patent
Sultan

(10) Patent No.: US 6,804,657 B1
(45) Date of Patent: Oct. 12, 2004

(54) METHODS AND SYSTEMS FOR GLOBAL SALES FORECASTING

(75) Inventor: Juliette Sultan, San Francisco, CA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 09/569,188

(22) Filed: May 11, 2000

(51) Int. Cl.[7] .............................................. G06F 17/60
(52) U.S. Cl. ................................ 705/10; 705/1; 705/7; 707/104.1
(58) Field of Search ........................ 705/10, 7, 8, 11, 705/1, 35, 36; 709/200, 213; 707/1, 100, 101, 104.1

(56) References Cited

U.S. PATENT DOCUMENTS

| | | | | |
|---|---|---|---|---|
| 5,671,360 A | * | 9/1997 | Hambrick et al. | 705/9 |
| 5,946,662 A | * | 8/1999 | Ettl et al. | 705/8 |
| 6,032,125 A | * | 2/2000 | Ando | 705/10 |
| 6,067,525 A | * | 5/2000 | Johnson et al. | 705/10 |
| 6,205,433 B1 | * | 3/2001 | Boesch et al. | 705/26 |
| 6,351,738 B1 | * | 2/2002 | Clark | 705/37 |
| 6,405,207 B1 | * | 6/2002 | Petculescu et al. | 707/102 |
| 6,510,420 B1 | * | 1/2003 | Cessna et al. | 706/45 |
| 6,581,068 B1 | * | 6/2003 | Bensoussan et al. | 707/104.1 |
| 6,671,673 B1 | * | 12/2003 | Baseman et al. | 705/7 |

FOREIGN PATENT DOCUMENTS

JP 11259564 * 9/1999 .......... G06F/17/60

OTHER PUBLICATIONS

Chandrashekar et al., "Toward the Virtual Supply Chain", International Journal of Logistics Management, 1999 [retrieved Mar. 4, 2003], vol. 10, No. 2, 16 pages, retrieved from: Dialog, file 15.*

* cited by examiner

Primary Examiner—Tariq R. Hafiz
Assistant Examiner—B. Van Doren
(74) Attorney, Agent, or Firm—Young Law Firm, P.C.

(57) ABSTRACT

A method of generating a real time global sales forecast for a company includes steps of defining an hierarchical structure for a sales force of the company and defining a place within the structure for each member thereof. Original pipeline sales information may then be remotely entered by members of the sales force and tagged to the customer, to the relevant product and/or services and to that member of the sales force having entered it. Pipeline sales information included in the original pipeline sales information may then be selectively modified to generate forecast sales information that is also stored and tagged. The original pipeline sales information is maintained unchanged in the database. The stored sales forecast and/or pipeline information may then be selectively aggregated according to the hierarchical structure to generate a real time sales forecast over a selected time period.

27 Claims, 4 Drawing Sheets

//METHODS AND SYSTEMS FOR GLOBAL SALES FORECASTING

BACKGROUND OF THE INVENTION

1. Field of the Invention

This invention relates to the management of international and global organizations. More particularly, the present invention relates to the generation of real time sales forecasts for large organizations, such as multi-national corporations.

2. Description of the Related Art

Effective management of large business entities or complex projects requires that the decision-makers be provided with accurate and timely information. Inaccurate and out of date information cannot model the historical or present behavior of the entity with any degree of certainty, nor can such data provide a reliable basis for projections of future performance. Such imperfect information naturally skews the decision making process, and the company's behavior in the marketplace may not be as nimble as it might otherwise have been with more accurate and timely information.

Sales forecasting is an example where the need for timely information is highest. Inaccurate or out of date sales forecasting information provides the decision maker, such as the CEO of a large multinational company, with a skewed view of the direction in which his or her company is proceeding. In turn, such out of date and inaccurate sales forecasting information may impair the decision maker's ability to implement anticipatory corrective measures, or to accurately characterize the anticipated performance of the company when communicating with industry analysts, for example.

Typically, regional sales forecasting information is gathered from salespersons within a sales force of a large corporation and inputted on a spreadsheet computer program. These spreadsheets may then be manually and painstakingly merged together to create regional sales forecasts, territorial sales forecasts and national sales forecasts. These national Sales forecasts are typically expressed in as many national currencies as the number of countries in which the company maintains a sales force. Such national forecasts are typically prepared by the financial department of the company's national headquarters. The national sales forecasts, in turn, must be converted into a preferred currency (typically the currency of the country in which the company world headquarters is located) and individually merged by the financial department of the company's world headquarters to form a global sales forecast for the company.

It can be appreciated, however, that this process of gathering sales information, inputting the sales information into spreadsheets, converting the currencies and merging the spreadsheets is a burdensome, slow and costly process. Indeed, by the time the global sales forecast reaches the CEO or other high-level decision makers, it may not accurately reflect current pipeline sales information or recent deals and is thus out of date. Such out of date sales forecast further contributes to the inertia of large organizations, and renders them less responsive to today's increasingly fluid and dynamic marketplace as they might otherwise be if they were to be provided with timely forecasting abilities.

It is an object of the present invention, therefore, to provide large organizations with methods and systems to generate real time sales forecasts upon demand. In particular, it is an object of the present invention to provide methods and systems to provide multi-national corporations with methods and systems to securely generate real time global sales forecasts at any level of the sales force hierarchy, across product lines, sales teams or any other subset, combination or permutation thereof.

SUMMARY OF THE INVENTION

An object of the present invention, therefore, is to provide methods and systems for generating real time sales forecasts upon demand. Another object of the present invention is to provide methods and systems to provide multi-national corporations with methods and systems to securely generate real time global sales forecasts at any level of the sales force hierarchy. In accordance with the above-described objects and those that will be mentioned and will become apparent below, a computer-implemented method of generating a real time global sales forecast for a multi-national company, according to an embodiment of the present invention, includes steps of defining an hierarchical structure for a sales force of the company; defining a place within the hierarchical structure for each member of the sales force; accepting original pipeline sales information remotely entered by members of the sales force over a computer network; storing the original pipeline sales information in a database, the stored original pipeline sales information being tagged to that member of the sales force having entered the original pipeline sales information; selectively modifying pipeline sales information included in the stored original pipeline sales information to generate forecast sales information while maintaining the stored original pipeline sales information unchanged; storing the forecast sales information in the database and tagging the stored forecast sales information to that member of the sales force having modified the pipeline sales information; and selectively aggregating the stored sales forecast information according to a hierarchy indicated by the hierarchical structure to generate, upon request, a real time sales forecast over a selected time period.

The hierarchical structure may be a global sales hierarchical structure that includes a national hierarchical sales structure for each country where the company maintains a sales force. The original pipeline sales information may be accepted in a plurality of national currencies and the selective aggregation step may include the steps of selecting at least one currency of the plurality of currencies in which the real time sales forecast is to be generated, and converting the aggregated stored forecast information to the selected at least one currency. The original pipeline sales information may be accepted in a plurality of national currencies and the aggregating step may include the step of selectively aggregating the stored sales forecast information of each national hierarchical sales structure in at least one of the plurality of national currencies; converting a currency of each aggregated stored sales forecast information into the at least one of the plurality of national currencies, and aggregating each of the currency-converted and aggregated stored sales forecast information to generate the real time global sales forecast.

The pipeline sales information-storing steps may include steps of transmitting the pipeline sales information to the database over the computer network. The network may include the Internet. Each member of the sales force of the company may be assigned a permission level, the assigned permission level determining which stored sales forecast information are aggregated in the real time sales forecast. A real time sales forecast may be generated by aggregating only stored sales forecast information and/or stored pipeline sales information of those members of the sales force having a lower permission level than a member of the sales force having requested the real time sales forecast. A step of granting a global permission level may be carried out, the global permission level enabling that member of the sales force to whom it is granted to generate a real time sales forecast including all stored sales forecast information and/or all stored pipeline sales information. The sales force may include C-level executives of the company, irrespective of whether the C-level executives have sales responsibilities. A step of granting a special permission level may be granted, the special permission level enabling a person to whom it is granted to generate a real time sales forecast of selected stored sales forecast information and/or selected pipeline sales information.

The present invention is also a computer-implemented method of generating a real time aggregate sales forecast for a multi-national company, comprising the steps of defining a hierarchical structure representative of an organization of an entire sales force of the multi-national company; providing a remotely accessible Internet application, the Internet application being configured to allow each member of the sales force to remotely input pipeline and/or forecast sales information via an Internet browser and to store the at least one of inputted sales and forecast information in a single database; selectively allowing the pipeline and/or sales information to be rolled up the hierarchical structure upon request and summed to generate the aggregate sales forecast over a selected time period.

The rolling up step may be carried out to a highest level in the hierarchical structure and the aggregate sales forecast may be a global sales forecast for the multi-national company. The selectively allowing step may include steps of assigning a permission level to each salesperson within the sales force according to a position of each member of the sales force within the hierarchical structure and the assigned permission level may determine what pipeline and/or sales forecast information may be included in the aggregated sales forecast. At least the Chief Operating Officer (CEO) of the multi-national company may be assigned a highest permission level. The selectively allowing step may further include steps of assigning a special permission level to a person, the special permission level being uncorrelated to a position of the person within the hierarchical structure.

According to a still further embodiment thereof, the present invention is a computer system adapted to generate of a global sales forecast for a multi-national company, comprising a database; a plurality computers, each of the computers being adapted to access the database over the Internet; a global sales forecasting application, the application being accessible from a secure Web site by the plurality of computers, the forecasting application being adapted to accept original pipeline sales information, to store the accepted pipeline sales information in the database and to allow selective access thereto by the plurality of computers depending upon an assigned permission level.

The forecasting application may be adapted to express the original pipeline sales information into one or more selected currencies. The forecasting application may be adapted to selectively aggregate stored pipeline sales information according to a hierarchy of a sales force of the company and depending upon the assigned permission level of a person making the request. The forecasting application may be adapted to allow selected members of the sale force to selectively modify pipeline sales information included in the original pipeline sales information to create forecast sales information over a specified period of time. The stored original pipeline information is preferably maintained unchanged and stored separately from the forecast sales information.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE INVENTION

Functional Description

Figure 1:
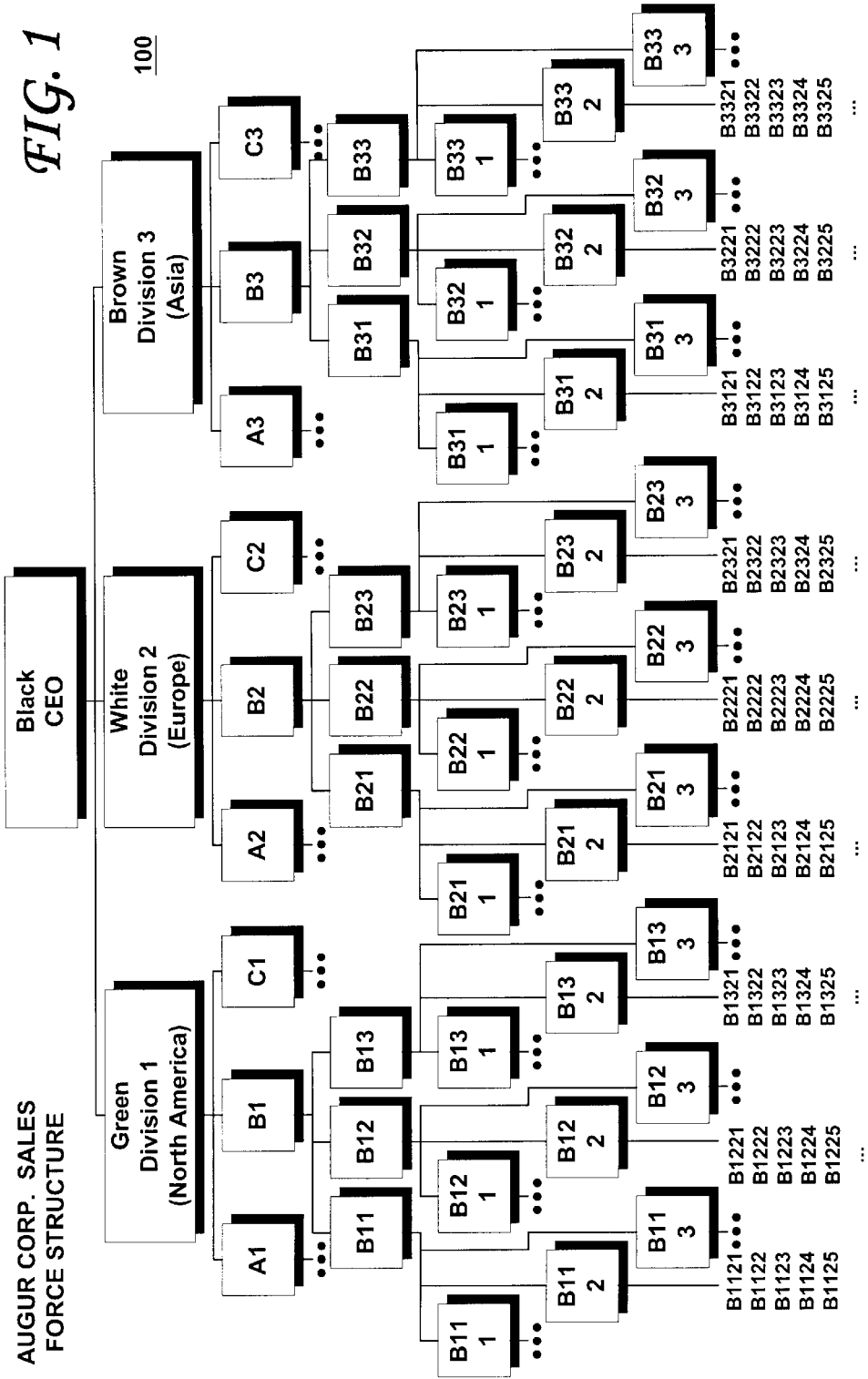
FIG. 1 shows a hierarchy representative of the organization of the sales force of a large, multi-national corporation.

FIG. 1 shows a hierarchy 100 representative of the organization of the sales force of a large, multi-national corporation called Augur Corp., for illustrative purposes. As shown therein, the hierarchical organization of Augur's sales force follows a generally pyramidal structure in which the individual account representatives (B1121 to B3325) are at the bottom levels and the Chief Executive Officer (hereafter "CEO") position is at the top level. In the example shown in FIG. 1, Augur Corp. has three main divisions; namely, Division 1 covering the North American sales territory, Division 2 covering the Europe sales territory and Division 3 covering the Asian sales territory. The division-level positions within the hierarchical sales structure may be occupied by persons of the Vice-President level within the company. The Division 1, 2 and 3 positions may have hierarchically-lower Regional Manager positions reporting thereto such as A1, B1, C1; A2, B2, C2 and A3, B3, C3, respectively. Each of the Regional Manager positions A1 through C3 has a number of other Sales Managers at hierarchically lower positions that reports thereto. For example, the Sales Manager positions B11, B112 and B113 report directly to the Regional Manager occupying position B1 within Augur Corp. In turn, a number of Account Supervisor positions B111 through B333 report to the Sales Manager positions B1 through B33. In turn, in the example of FIG. 1, a number of Account Representatives positions B1121 through B3325 report to the above-identified Account Supervisor positions. It is to be understood that not all of the positions within the sales organization are shown in FIG. 1, for clarity of illustration. It should also be understood that the hierarchical structure 100 of FIG. 1 is shown for exemplary purposes only, and should not be construed to limit the scope of the present invention in any way. Indeed, the present invention is applicable to any sales organization, whatever the form of the hierarchical or logical structure thereof. Moreover, the applicability of the present invention extends beyond the realm of sales organizations to cover any situation wherein a plurality of persons enter any type of forecast information that is selectively viewable and/or modifiable by others in the organization.

According to the present invention, once the corporation's hierarchical sales structure for the entire global sales force of the company is defined, as shown in FIG. 1, a place within the hierarchical sales structure is defined for each person in the sales organization within the company. For example, the CEO position is occupied (in the example of FIG. 1) by Black, whereas the Divisions 1, 2 and 3 positions are occupied by vice Presidents Green, White and Brown, respectively. In the same manner, each member of the sales force of Augur Corp. is assigned a place within the hierarchical sales organization of FIG. 1. The hierarchical sales structure, according to the present invention, is not static, but is a dynamic structure wherein positions may be created and deleted at will, as the sales outlook changes. In so doing, entire new branches may be grafted onto or pruned from the hierarchical tree structure of FIG. 1, as needed.

In addition to being assigned a place within the hierarchical sales structure, each member of the sales force is assigned a permission level. According to the present invention, the permission level determines what information is available to each person within the sales force and in particular, what forecast information is visible, accessible and/or modifiable to and by each person. For example, the assigned permission level may be co-extensive with the person's position within the sales hierarchy 100, with the higher-ranking positions generally enjoying a higher permission level than lower-level sales positions in the hierarchy 100. For example, the CEO position may have the highest permission level associated therewith, whereas the individual sales positions (B1121 through B3325) may have the lowest permission levels assigned thereto. In the example illustrated in FIG. 1, Black has the highest permission level, and the individuals occupying the Account Representative positions B1121 through B3325 may be assigned the lowest permission levels.

Therefore, according to the present invention, the entire sales force of the corporation is organized in a monolithic logical structure, as compared to several small hierarchical structures organized along territorial, national and/or product-based lines. Having defined the hierarchical structure 100 and assigned each person within the sales force a position therein; some means must be devised to allow relevant sales forecasting information to be inputted, stored, processed, retrieved and displayed. Rather than storing the sales forecast information in a plurality of databases in a potentially equal number of formats in each of the countries in which the company maintains a presence, the present invention provides for storing all forecasting information in a single database, referenced at 310 in FIG. 3.

Figure 3:
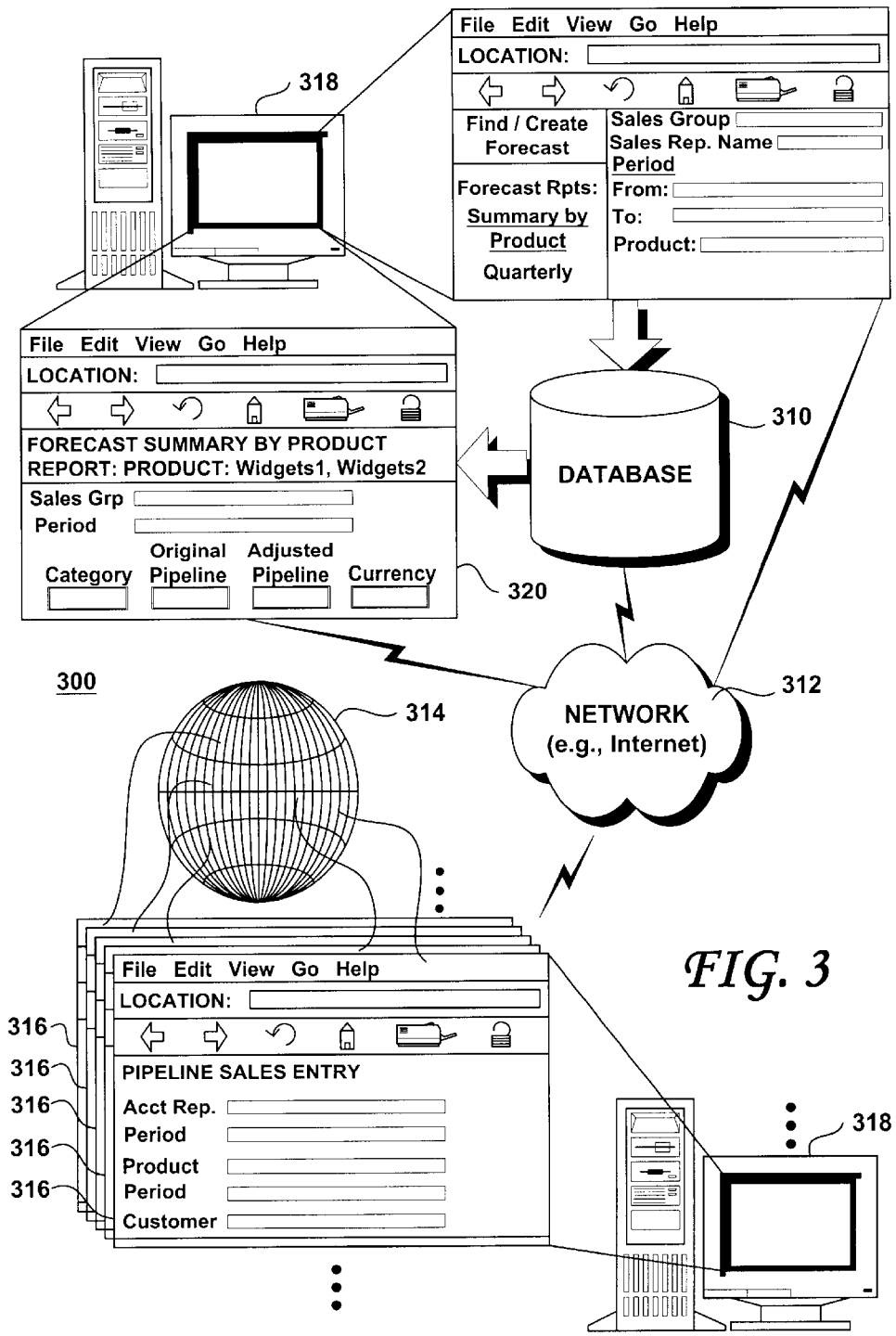
FIG. 3 shows a representation of the method and system of generating global sales forecasts, according to an embodiment of the present invention.

FIG. 3 shows a representation of the method and system 300 of generating global sales forecasts, according to an embodiment of the present invention. As shown therein, this single database 310 is adapted to store all pipeline and forecasting information inputted by each member of the global sales force of the corporation, irrespective of the person's position within the sales force organization and irrespective of the Division he or she belongs to or the country or countries from which he or she operates. It becomes necessary, therefore, to loosely couple all of the members of the sales force to allow the individual members thereof to input sales forecasting data into the database 310 and to retrieve useful forecasts therefrom. According to the present invention, all of the members of the sales force of the corporation are loosely coupled to the database 310 through a computer network 312. The computer network may include the Internet, for example, and/or other communication infrastructure. Indeed, the terms Internet and network are used interchangeably herein, and are intended to cover the Internet as it exists as of the time of this writing, and also any other communication infrastructure for computers and/ or other network devices yet to be developed. Security may be assured by suitable encryption of all communications and/or by creating secure Virtual Private Networks or by other means known to those of skill in this art, such as a Secure Socket layer (SSL). As shown in FIG. 3, each member of the sales force organization inputs pipeline and sales forecasting information through an Internet global forecasting application according to the present invention, via an Internet browser software 316 or via another suitable interface. Therefore, with the aid of a personal computer, network computer, Internet-enabled personal digital assistant, any device equipped with a modem or other network access device allowing remote access to the corporate network or other Internet-enabled appliance (collectively shown in FIG. 3 as personal computers 318, 324), the entire global sales force throughout the world 314 may asynchronously input pipeline sales information and/or sales forecasting information by using a suitable communications application (such as Netscape Navigator, for example) and pointing the browser to a selected secure site (a World Wide Web site, for example) established for that purpose. Upon being properly authenticated (through inputting a username and password, for example), the sales person may be prompted or given the opportunity to enter, for example, pipeline sales information. The sales person may also be granted limited access to any information stored in the database 310.

According to the present invention, pipeline sales information is the raw forecasting information entered by the sales person, be they Account representatives or any other hierarchically higher position with the sales organization. Specifically, pipeline sales information may be defined as the value of the goods and/or services that the sales person believes he or she will sell to a given customer over a specified period of time. Pipeline sales information represents an important part of the raw data upon which much of the global sales forecasting abilities of the present invention are based. The pipeline sales information may be specified in the national currency of the country in which the customer and/or the sales person is based, although the pipeline sales information may later be expressed in the any currency the user may choose. For example, if the sales person occupying sales position B2224 expects to sell 5,000 worth of identified goods to a specified company within his or her territory (in this case, the United Kingdom) during the upcoming $4^{th}$ quarter, 5,000 would be the pipeline forecast amount for that sales person, that customer, those identified goods and that time period. In this case, the currency of the pipeline sales information is, the British Pound.

Figure 2:
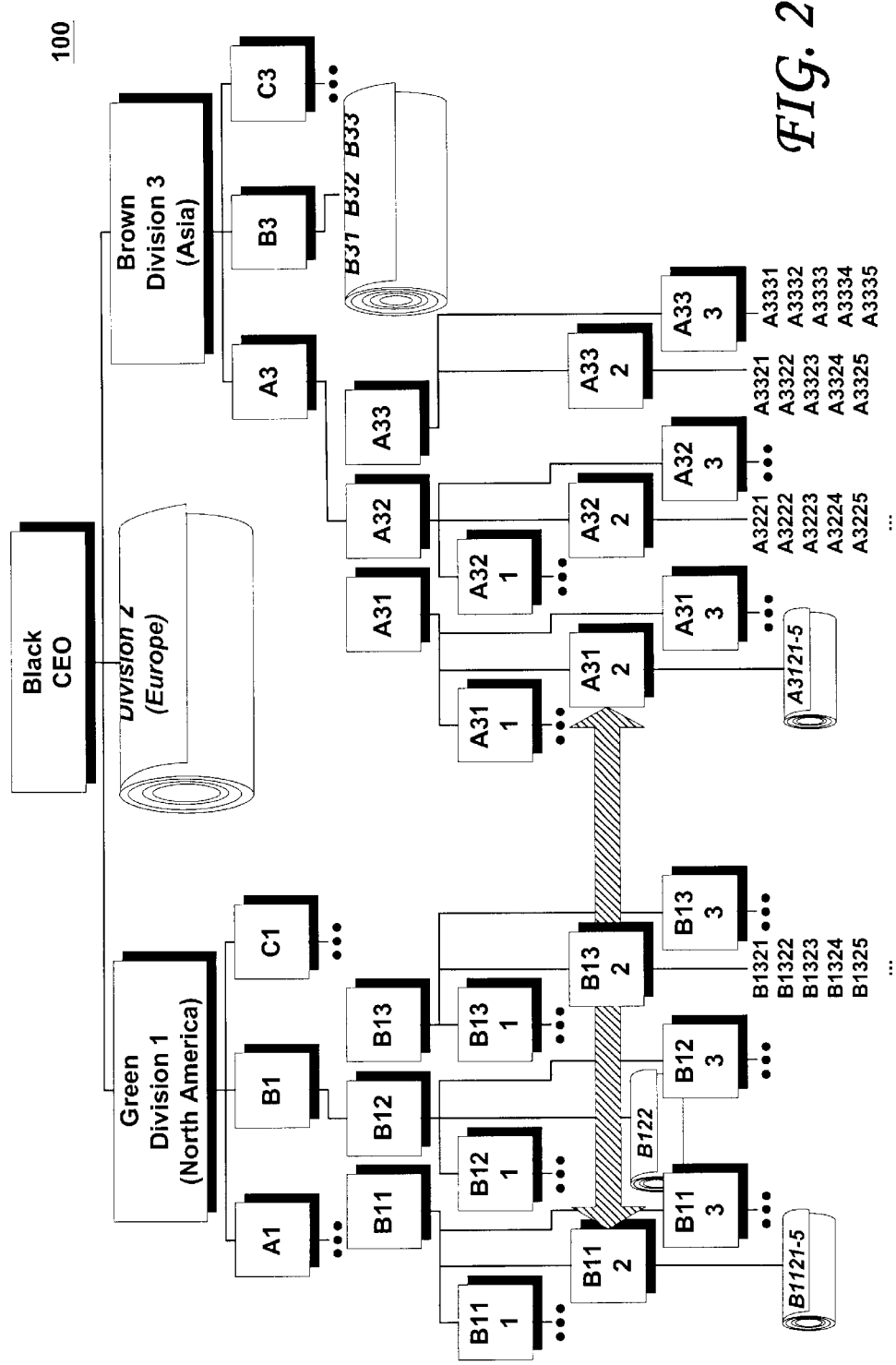
FIG. 2 shows the hierarchy of FIG. 1, in which sales forecast and/or pipeline sales information are selectively rolled up, according to an embodiment of the present invention.

Returning now to the Augur Corp. example developed above with reference to FIGS. 2 and 3, according to the present invention, the sales person occupying the B2224 position may access and log onto Augur Corp.'s secure Web site with a browser software 316, for example, and input original pipeline information for that time period and that customer. The entered original pipeline information is then securely transmitted over the network 312 and stored in Augur Corp.'s database 310. The pipeline sales information may be tagged to the customer, the relevant products and/or services in question and to the position and the name of the person having entered it; namely, sales person B2224 in this example. Similar original pipelines sales information may be entered by each member of the sales force and stored in the database 310, each original pipeline information entry being tagged to the customer, to the relevant products and/or services and to the sales force member's position in the hierarchy 100 and to the sales force member's name. Each pipeline information entry may be expressed in the national currency of the country in which the sales person and/or customer is located and/or any other selected currency. The original pipeline sales information is maintained unchanged in the database 310.

However, the original pipeline sales information may not accurately reflect the actual anticipated sales for a particular customer and/or particular goods or services. Indeed, the direct hierarchical superior of the sales person having entered the original pipeline information may have additional information not available or disclosed to his or her subordinate, which additional information may affect the original pipeline information. Alternately, the sales person's manager may know that this sales person usually enters overly conservative or unduly aggressive pipeline sales information. Therefore, persons within the sales force occupying positions within the hierarchy that are higher than that of the sales person having entered the pipeline information may modify pipeline sales information included in the original pipeline sales information by increasing or decreasing it, at their discretion. This modified pipeline sales information then, according to the present invention, becomes forecast information. Forecast information, therefore, represents a greater level of maturity and confidence that may not be present in the original pipeline information. The forecast information is also entered through a suitable Internet application, such as a Web browser 316, tagged to the person (and to his or her position within the hierarchy 100) having modified the pipeline sales information and stored in the database 310. Therefore, according to the present invention, both pipeline and forecast information may be entered by the sales force, transmitted over the network 312 and stored in the database 310, together with tagging information that identifies the customer, products and/or service and the specific member of the sales force (by position and name) having entered and/or modified the pipeline and/or forecast sales information. Indeed, the pipeline and/or forecast information may include, for example, an identification of the goods and/or services to be sold, an identification of the customer, the time frame during which the pipeline and/or forecasted sales are to take place, among others. This other information is also entered, tagged to the sales force member having entered it and stored within the database 310.

The entered pipeline and sales information, however, should not be universally accessible by all members of the sales organization. For example, the member of the sales force occupying the Sales Manager position B11 should have access to the pipeline and forecast sales information entered and/or modified by his or her hierarchically-lower Account Supervisors B111, B112 and B113 and entered by those Account representatives (e.g., B1121–B1125, among others) that report to him. However, the Sales Manager B11 may have no reason to access either pipeline or forecast information from Sales Managers B12, B13 (even though B12 and B13 belong to the same Division as B11) or that of any other Sales Manager or any hierarchically higher Regional manager, Division Head or CEO. To restrict access to the pipeline and/or forecast information, the assigned permission levels are used. In general, the permission levels for access pipeline and/or forecast information matches a sales force member's hierarchical position within the sales organization, unless such sales force member belongs to an "overlay organization" that participates in the opportunity and has permission to add information to it, but does not "own" the corresponding forecast. Moreover, unless modified, a member of the sales force may only access (read and/or modify) pipeline and/or forecast information tagged to hierarchically lower members within a same branch of the hierarchical tree structure. For example, although the sales force member occupying the Sales Manager position B11 may access only that pipeline and/or forecast information of those members of the sales forces reporting to him. In this example, although B11 may access the pipeline and/or forecast information tagged to underlings B111, B112 and B113, B11 may not access the pipeline and/or forecast information tagged to B121 or B231, even though these positions are hierarchically lower than the B11 position, as B121 and B231 do not report to B11.

As suggested by the horizontal hashed doubled headed arrow in FIG. 2, special permission levels may be defined, thereby allowing any member of the sales force (or any other designated person) to access pipeline and/or forecast information tagged to positions that do not report to them, subject to the restriction regarding "overlay organizations" detailed above. In the example shown in FIG. 2, Account Supervisors B112 and A312 may share a same permission level, enabling them to access each other's pipeline and/or forecast information, in addition to the pipeline and/or forecast information tagged to positions directly reporting to each of them. This shared permission level may be established to share information when sharing a deal. However, forecast responsibility for a deal cannot be shared, as a deal cannot be forecast twice. Forecast of a deal may nevertheless be split between two or more salespersons, for example. In the same manner, any member of the sales force (or any other selected person, even if such person is not a part of the sales force, such as a technician) may be granted any level of position, whether higher or lower than his or her hierarchical position in the sales organization, again subject to the restriction regarding "overlay organizations" detailed above. For example, a single person may be responsible for a single product or a family of related products, across the entire corporation. Such a person may be granted a special permission level to enable him or her to access specified all pipeline and/or forecast information related to the product or family of products at a global level, across all divisions. For example, such a person might belong to a finance department dealing with revenue forecasts. The specified pipeline and/or forecast information may be restricted to a specific time frame, a specific product or family of products, or any class of information entered by any member of the sales force into the database 310 of FIG. 3. Moreover, the permissions granted may be further restricted to read only, to pipeline information only, to forecast information only or to any combination thereof. Further, permissions may be defined for a specific deal or deals for a specific customer or customers. Such permissions may automatically expire upon the occurrence of a specified event or combination of events. Such a fine-grained control over the granting of permissions allows a high degree of control over what pipeline and/or forecast information seen by each member of the sales force sees.

As graphically represented in FIG. 2, the generation of pipeline and/or forecasting information is carried out by "rolling up", or aggregating the pipeline and/or forecast information entered and/or modified at hierarchically lower positions in the corporate sales organization. The pipeline and/or forecast information that is aggregated may be as specific as the underlying pipeline information that is initially entered into the database 310. Indeed, the rolled up forecast may represent the forecast for all goods and services whose sale is anticipated during the specified future time period, or as specific as the aggregate value of rebates on the future sale of a specified product for a specified subsidiary of a specified customer over a specified period of time. Indeed, the granularity of the forecast is limited only by the granularity of the underlying raw data; namely, the pipeline information.

Considering now FIGS. 2 and 3 collectively, Account Supervisor B112 may want to generate a forecast for the sales of a particular product over a specified future time period, based upon the pipeline information entered by those Account representatives that report to her; namely Account representatives B1121 through B1125. After individually reviewing the pipeline information entered by each Account representative B1121 through B1125, B112 may cause a forecast to be generated, as graphically represented in FIG. 3 by "rolling up" the forecast information for each of the Account representatives B1121 through B1125 that report to her. This may be done by issuing an appropriate query (predetermined query run by clicking on a "forecast tab", for example, on the user's screen—see reference 320 in FIG. 3) to the database 310 via an Internet browser running the global forecasting application according to the present invention. As a result, Account Supervisor B112 will see a forecast 322 (covering the next quarter, for example) including the aggregate (the sum) of the sales forecasts for each of her Account Representatives B1121 through B1125. For example, suppose that the Augur's Account representatives in Japan A3322 and A3334 enter the following information into the database 310, indicating that one of Augur Corp.'s customers, ABC, Inc. plans to purchase the following items:

| Customer | Item | Amount | Close Date | Account Representative |
|---|---|---|---|---|
| ABC, Inc. | Widgets1 | $600,000 | Dec. 2 | A3322 |
| ABC, Inc. | Widgets2 | $400,000 | Dec. 2 | A3334 |

The $400,000 and $600,000 amounts, therefore, become the pipeline information. With reference to FIG. 3, Account Representative A3322 reports to Account Supervisors A332 and A333, respectively. Therefore, unless other permissions have been granted Account Supervisors A332 and A333, each may only view the pipeline amounts entered by those reporting to them: Account Supervisor A332 may only access and/or modify the $600,000 pipeline information for Widgets1 and Account Supervisor A333 may only access and/or modify the $400,000 pipeline information for Widgets2. A332 may have previous experience with Account Representative A3322 and know that the pipeline information entered by A3322 is historically about 10% under the actual number of Widgets1 that are subsequently actually sold to ABC, Inc. Therefore, A332 may modify the $600,000 pipeline information and enter 660,000 as the forecasted sale of Widgets1 to ABC, Inc. Likewise, A333 may have knowledge regarding ABC, Inc. than that of Account representative A3334 and she may believe that ABC, inc. will require $500,000 worth of Widgets2 by the close date of December 2. A333 may then modify the pipeline information and enter the revised amount of $500,000, which is also stored into the database 310 and tagged to A333. The originally entered pipeline information, however, remains unchanged and available at all times in the database 310.

Indeed, A332 may view (on a Web page, for example) the current (real time) pipeline information by customer (as opposed to by product, as suggested at reference 320 in FIG. 3) according to the present invention, as follows:

| Customer | Widgets1 | Widgets2 | Close Date | Total | Account Rep. |
|---|---|---|---|---|---|
| ABC, Inc. | $600,000 | | Dec. 2 | $600,000 | A3322 |

Likewise, A333 may view the current pipeline information according to the present invention, as follows:

| Customer | Widgets1 | Widgets2 | Close Date | Total | Account Rep. |
|---|---|---|---|---|---|
| ABC, Inc. | | $400,000 | Dec. 2 | $400,000 | A3334 |

The pipeline sales information for Widgets2 is not available to A332, as Account representative A3334 does not report to A332. In other words, the permission level assigned to A332 will not allow A332 to access pipeline and/or sales forecast information from those members of the sales force not directly reporting to the A332 position. Similarly, the pipeline sales information for Widgets1 is not available to A333, as Account representative A3322 does not report to A333. In other words, the permission level assigned to A333 will not allow A333 to access pipeline and/or sales forecast information from those members of the sales force not directly reporting to the A333 position.

In any event, Sales Manager A33, to whom both A332 and A333 report, may run the forecasting application according to the present application, and have access to and/or modify the A332 and A333's forecast information, as well as view the stored original pipeline information above. When A33 runs the forecasting application according to the present invention over a Web browser and accesses the stored information in the database 310 over the computer network 312, the following may be generated and viewed, detailing the following forecasting information:

| Customer | Widgets1 | Widgets2 | Close Date | Total | Account Rep. |
|---|---|---|---|---|---|
| ABC, Inc. | $660,000 | $500,000 | Dec. 2 | $1,160,000 | A3322, A3334 |

In this case, the total forecasted sales for Customer ABC, Inc. for both Widgets1 and Widgets2 for the period ending December 2 is $1,160,000; that is, the sum of the forecasted sales for Sales Managers A332 and A333. Sales Manager A33 may also modify the forecasted amounts for Widgets1 and/or Widgets2, based upon her judgment. Both the original amount and the modified amounts will, however, remain stored and available in the database 310.

Indeed, as the pipeline sales information is maintained unchanged in the database 310, A33 may view the original (or the current) pipeline sales information before submitting his forecast and/or may view the last submitted forecast. A33 may also review the forecast at a deal level on a worksheet (Web) page, to view the forecast broken down by deal and sales or account representative, for example, as follows.

| Customer | Widgets1 | Widgets2 | Close Date | Total | Account Rep. |
|---|---|---|---|---|---|
| ABC, Inc. | $600,000 | $400,000 | Dec. 2 | $1,000,000 | A3322, A3334 |

In like manner, Regional Manager B3 may view a pipeline and/or a forecast by rolling up (summing) the pipeline and/or forecast information of all those directly or indirectly reporting to him. As shown in FIG. 2, the rolled up pipeline and/or forecast information includes the pipeline and/or forecast information of Regional Managers B31, B32 and B33 that directly report to him. Regional Manager B3 may request that the pipeline and/or forecast information be presented with as little or as much detail as desired. Indeed, the rolled up pipeline and/or forecast information may represent anticipated sales across product lines or for a single product, for any time period for which pipeline information exists, for all Account Supervisors or for a single selected Account Supervisor or even down to the deal and Sales representative level. Any member of the sales force, therefore, may drill down as far as the most granular level available, as long as his or her assigned permission level allows it.

Likewise, Division Head White may generate a pipeline and/or forecast in real time by causing the application according to the present invention to aggregate all stored information corresponding to the parameters entered by those in the European sales force reporting to her. is Such reports may be generated in one of the national currencies of Europe or in any other selected currency. For example, Division 2 Head White may select a currency (or currencies, such as the US dollar and the Euro) in which the real time sales forecast is to be generated, and the stored forecast information may be converted into that selected currency or currencies prior to or after the relevant information is summed to create the forecast. Alternatively, the stored sales forecast information of each national hierarchical sales structure (e.g., that of France, Germany, England, for example) may be selectively aggregated in the corresponding national currency (The French Franc, the German Mark and the British Pound in this example). Thereafter, the currency of each of the aggregated sales forecast information may be converted into a selected currency, which selected currency may be one of the national currencies of the hierarchically lower national sales hierarchical structures or another selected currency altogether. Each of the currency-converted and aggregated stored sales forecast information may then be aggregated to generate a real time sales forecast at the Division Level. Accuracy in foreign exchange may be maintained by accessing, through the network 312 (the Internet, for example) reliable sources of foreign exchange information contemporaneously with the generation of the real time forecast. The foreign exchange information may also be pulled from General Ledger (GL) tables of an accounting application that include monthly, weekly, daily average and/or actual currency exchange rates, for example. Similarly, CEO Black may generate company wide global real time forecasts including the pipeline and/or sales information tagged to all members of the multinational sales force. Such forecasts may include as little or as much detail as is desired, and may be generated at a high level (across Divisions 1, 2 and 3) or at the lowest level (i.e., down to the pipeline information entered by any of the individual Sales Representatives B1121 et seq.). With specific reference to FIG. 2, CEP Black may, through a computer 318 connected to the network 312, request a forecast by entering the parameters for the desired forecast in a first screen, such as shown at 320. In the case illustrated in FIG. 3, a Summary by Product forecast is requested. In response to parameters entered by CEO Black, the database 310 is accessed and a forecast is generated corresponding to the parameters entered by aggregating the stored forecast information remotely entered by each of the relevant members of the sales force through respective computers 324 (or other network-connected devices) connected to the network 312. The forecast may be presented to CEO Black on a second screen, such as shown at 322. The forecast generated for Black, in this case, is a real time global and company wide summary of forecasted sales for Widgets1 and Widgets2, to use the example developed above. The forecast is real time, because it is as current as the most recent pipeline and/or forecast sales information entered by any of the members of the company's sales force. Global (or company-wide) forecasting, according to the present invention, therefore becomes a highly flexible management tool, whereby forecasts are generated on the fly, using the most up-to-date pipeline and/or forecast data entered into the central database 310 via the Internet or other computer network. By virtue of such up-to-the-minute forecasting capabilities, corporations and C-level executives (e.g., CEO, CFO, COO, CTO etc.) are able to flexibly allocate human and physical resources where they will be most effective and identify and anticipate trends in the marketplace.

Hardware Description

Figure 4:
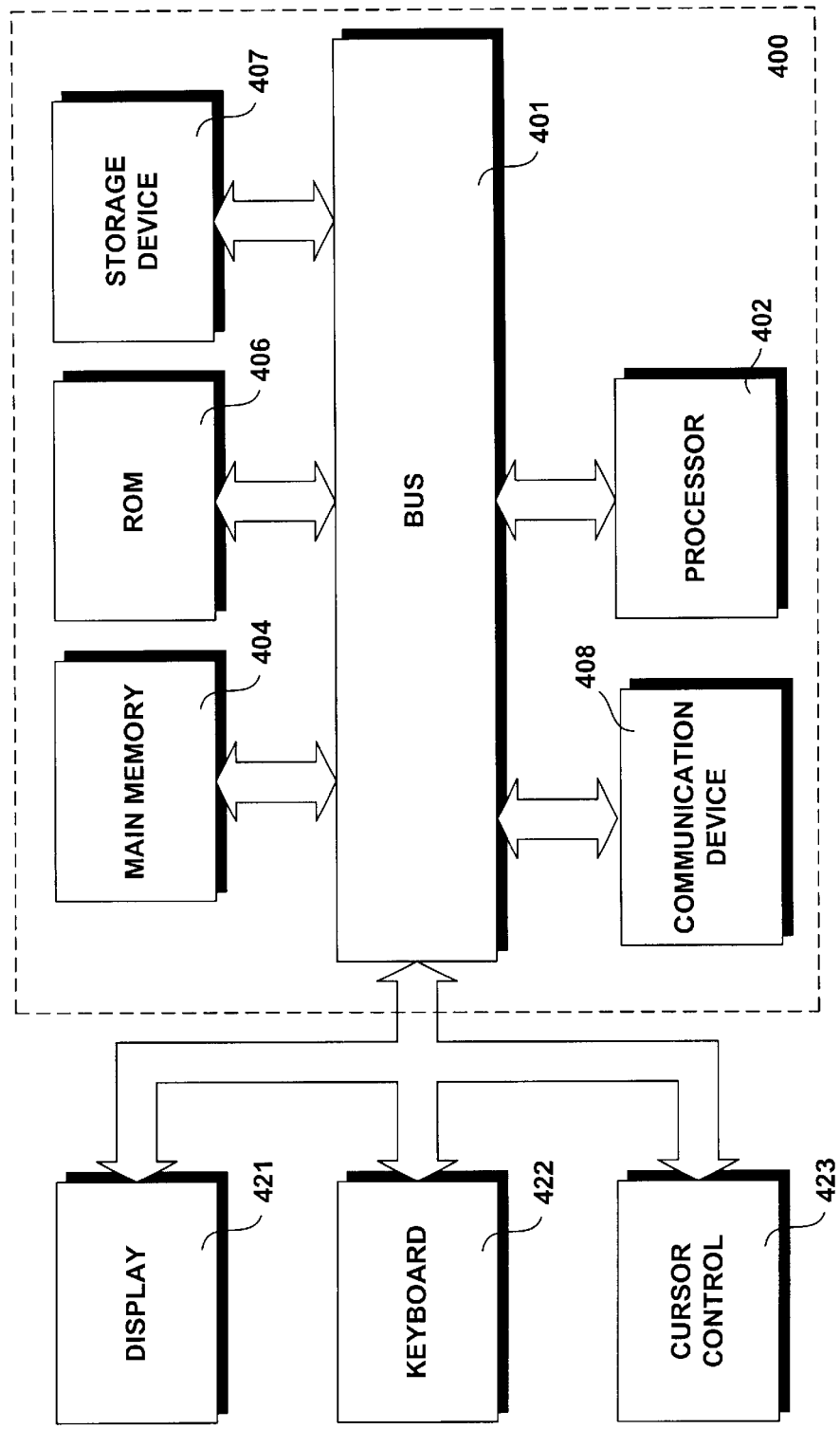
FIG. 4 illustrates a block diagram of a computer system with which an embodiment of the present invention may be implemented.

FIG. 4 illustrates a block diagram of a computer system 400 with which an embodiment of the present invention may be implemented. Computer system 400 includes a bus 401 or other communication mechanism for communicating information, and a processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also includes a read only memory (ROM) and/or other static storage device 406 coupled to bus 401 for storing static information and instructions for processor 402. A data storage device 407, such as a magnetic disk or optical disk, is coupled to bus 401 for storing information and instructions. A communication device 408, such as a modem or network (such as Ethernet, for example) card is also coupled to the bus 401 to provide access to a network, such as shown at 312 in FIG. 3.

The computer system 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device is cursor control 423, such as a mouse, a trackball, or cursor direction keys for communicating direction information and command selections to processor 402 and for controlling cursor movement on display 421.

The present invention is related to the use of computer system 400 to implement a global sales forecasting application over a computer network, such as the Internet. According to one embodiment, the hierarchical structure is provided by one or more computer systems 400 in response to processor(s) 402 executing sequences of instructions contained in memory 404. Such instructions may be read into memory 404 from another computer-readable medium, such as data storage device 407. Execution of the sequences of instructions contained in memory 404 causes processor(s) 402 to implement the global sales functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of generating a real time global sales forecast for a multi-national company, comprising the steps of:

defining an hierarchical structure for a sales force of the company, the hierarchical structure being a global sales hierarchical structure that includes a national hierarchical sales structure for each country where the company maintains a sales force;

defining a place within the hierarchical structure for each member of the sales force;

accepting original pipeline sales information remotely entered by members of the sales force over a computer network, the original pipeline sales information is accepted in a plurality of national currencies;

storing the original pipeline sales information in a database, the stored original pipeline sales information being tagged to that member of the sales force having entered the original pipeline sales information;

selectively modifying pipeline sales information included in the stored original pipeline sales information to generate forecast sales information while maintaining the stored original pipeline sales information unchanged;

storing the forecast sales information in the database and tagging the stored forecast sales information to that member of the sales force having modified the pipeline sales information; and selectively aggregating the stored sales forecast information according to a hierarchy indicated by the hierarchical structure to generate, upon request, a real time global sales forecast over a selected time period, by selectively aggregating the stored sales forecast information of each national hierarchical sales structure in at least one of the plurality of national currencies, converting a currency of each aggregated stored sales forecast information into the at least one of the plurality of national currencies, and aggregating each of the currency-converted and aggregated stored sales forecast information to generate the real time global sales forecast.

2. The method of claim 1, wherein the original pipeline sales information is accepted in a plurality of national currencies and wherein the selective aggregation step includes the steps of:

selecting at least one currency of the plurality of currencies in which the real time sales forecast is to be generated, and converting the aggregated stored forecast information to the selected at least one currency.

3. The method of claim 1, wherein the pipeline sales information-storing step includes a step of transmitting the pipeline sales information to the database over the computer network.

4. The method of claim 3, wherein the network includes the Internet.

5. The method of claim 1, wherein each member of the sales force of the company is assigned a permission level, the assigned permission level determining which stored sales forecast information are aggregated in the real time sales forecast.

6. The method of claim 5, wherein a real time sales forecast is generated by aggregating only stored sales forecast information and/or stored pipeline sales information of those members of the sales force having a lower permission level than a member of the sales force having requested the real time sales forecast.

7. The method of 6, further comprising the step of granting a global permission level, the global permission level enabling that member of the sales force to whom it is granted to generate a real time sales forecast including all stored sales forecast information and/or all stored pipeline sales information.

8. The method of claim 1, wherein the sales force includes C-level executives of the company irrespective of whether the C-level executives have sales responsibilities.

9. The method of claim 1, further comprising the step of granting a special permission level, the special permission level enabling a person to whom it is granted to generate a real time sales forecast of selected stored sales forecast information and/or selected pipeline sales information.

10. A computer system configured for generating a real time global sales forecast for a multi-national company, comprising:

at least one processor;

at least one data storage device coupled to said at least one processor;

a plurality of processes spawned by said at least one processor, the processes including processing logic for:

defining an hierarchical structure for a sales force of the company, the hierarchical structure being a global sales hierarchical structure that includes a national hierarchical sales structure for each country where the company maintains a sales force;

defining a place within the hierarchical structure for each member of the sales force;

accepting original pipeline sales information remotely entered by members of the sales force over a computer network, the original pipeline sales information is accepted in a plurality of national currencies;

storing the original pipeline sales information in a database, the stored original pipeline sales information being tagged to that member of the sales force having entered the original pipeline sales information;

selectively modifying pipeline sales information included in the stored original pipeline sales information to generate forecast sales information while maintaining the stored original pipeline sales information unchanged;

storing the forecast sales information in the database and tagging the stored forecast sales information to that member of the sales force having modified the pipeline sales information; and selectively aggregating the stored sales forecast information according to a hierarchy indicated by the hierarchical structure to generate, upon request, a real time global sales forecast over a selected time period, by selectively aggregating the stored sales forecast information of each national hierarchical sales structure in at least one of the plurality of national currencies; converting a currency of each aggregated stored sales forecast information into the at least one of the plurality of national currencies, and aggregating each of the currency-converted and aggregated stored sales forecast information to generate the real time global sales forecast.

11. The computer system of claim 10, wherein the original pipeline sales information is accepted in a plurality of national currencies and wherein the selective aggregation step includes the steps of:

selecting at least one currency of the plurality of currencies in which the real time sales forecast is to be generated, and converting the aggregated stored forecast information to the selected at least one currency.

12. The computer system of claim 10, wherein the pipeline sales information-storing step includes a step of transmitting the pipeline sales information to the database over the computer network.

13. The computer system of claim 12, wherein the network includes the Internet.

14. The computer system of claim 10, each member of the sales force of the company is assigned a permission level, the assigned permission level determining which stored sales forecast information are aggregated in the real time sales forecast.

15. The method of claim 14, wherein a real time sales forecast is generated by aggregating only stored sales forecast information and/or stored pipeline sales information of those members of the sales force having a lower permission level than a member of the sales force having requested the real time sales forecast.

16. The computer system of 15, further comprising the step of granting a global permission level, the global permission level enabling that member of the sales force to whom it is granted to generate a real time sales forecast including all stored sales forecast information and/or all stored pipeline sales information.

17. The computer system of claim 10, wherein the sales force includes C-level executives of the company irrespective of whether the C-level executives have sales responsibilities.

18. The computer system of claim 10, further comprising the step of granting a special permission level, the special permission level enabling a person to whom it is granted to generate a real time sales forecast of selected stored sales forecast information and/or selected pipeline sales information.

19. A machine-readable medium having data stored thereon representing sequences of instructions which, when executed by computing device, causes said computing device to generating a real time global sales forecast for a multi-national company by performing the steps of:

defining an hierarchical structure for a sales force of the company, the hierarchical structure being a global sales hierarchical structure that includes a national hierarchical sales structure for each country where the company maintains a sales force;

defining a place within the hierarchical structure for each member of the sales force;

accepting original pipeline sales information remotely entered by members of the sales force over a computer network, the original pipeline sales information is accepted in a plurality of national currencies;

storing the original pipeline sales information in a database, the stored original pipeline sales information being tagged to that member of the sales force having entered the original pipeline sales information;

selectively modifying pipeline sales information included in the stored original pipeline sales information to generate forecast sales information while maintaining the stored original pipeline sales information unchanged;

storing the forecast sales information in the database and tagging the stored forecast sales information to that member of the sales force having modified the pipeline sales information; and selectively aggregating the stored sales forecast information according to a hierarchy indicated by the hierarchical structure to generate, upon request, a real time global sales forecast over a selected time period, by selectively aggregating the stored sales forecast information of each national hierarchical sales structure in at least one of the plurality of national currencies; converting a currency of each aggregated stored sales forecast information into the at least one of the plurality of national currencies, and aggregating each of the currency-converted and aggregated stored sales forecast information to generate the real time global sales forecast.

20. The machine-readable medium of claim 19, wherein the original pipeline sales information is accepted in a plurality of national currencies and wherein the selective aggregation step includes the steps of:

selecting at least one currency of the plurality of currencies in which the real time sales forecast is to be generated, and converting the aggregated stored forecast information to the selected at least one currency.

21. The machine-readable medium of claim 19, wherein the pipeline sales information-storing step includes a step of transmitting the pipeline sales information to the database over the computer network.

22. The machine-readable medium of claim 21, wherein the network includes the Internet.

23. The machine-readable medium of claim 19, wherein each member of the sales force of the company is assigned a permission level, the assigned permission level determining which stored sales forecast information are aggregated in the real time sales forecast.

24. The machine-readable medium of claim 23, wherein a real time sales forecast is generated by aggregating only stored sales forecast information and/or stored pipeline sales information of those members of the sales force having a lower permission level than a member of the sales force having requested the real time sales forecast.

25. The machine-readable medium of 24, further comprising the step of granting a global permission level, the global permission level enabling that member of the sales force to whom it is granted to generate a real time sales forecast including all stored sales forecast information and/or all stored pipeline sales information.

26. The machine-readable medium of claim 19, wherein the sales force includes C-level executives of the company irrespective of whether the C-level executives have sales responsibilities.

27. The machine-readable medium of claim 19, further comprising the step of granting a special permission level, the special permission level enabling a person to whom it is granted to generate a real time sales forecast of selected stored sales forecast information and/or selected pipeline sales information.

* * * * *

UNITED STATES PATENT AND TRADEMARK OFFICE
CERTIFICATE OF CORRECTION

PATENT NO. : 6,804,657 B1  Page 1 of 1
APPLICATION NO. : 09/569188
DATED : October 12, 2004
INVENTOR(S) : Juliette Sultan It is certified that error appears in the above-identified patent and that said Letters Patent is hereby corrected as shown below:

In Column 15, line 55, replace "generating" with -- generate --.
In Column 16, line 51, before "24", insert -- claim --.

Signed and Sealed this

Fifth Day of December, 2006

JON W. DUDAS
*Director of the United States Patent and Trademark Office*